United States Patent [19]
Ehrhart et al.

[11] Patent Number: 5,198,521
[45] Date of Patent: * Mar. 30, 1993

[54] CONDUCTIVE POLYURETHANE-UREA/POLYETHYLENE OXIDE POLYMER

[75] Inventors: Wendell A. Ehrhart, Red Lion; Nowaf Halout, Lancaster; Kenneth K. Ko, West Grove; David A. Smith, York, all of Pa.

[73] Assignee: Armstrong World Industries, Inc., Lancaster, Pa.

[*] Notice: The portion of the term of this patent subsequent to Dec. 31, 2008 has been disclaimed.

[21] Appl. No.: 781,002

[22] Filed: Oct. 29, 1991

Related U.S. Application Data

[63] Continuation-in-part of Ser. No. 518,248, May 4, 1990, Pat. No. 5,077,330, which is a continuation of Ser. No. 237,315, Aug. 29, 1988, abandoned.

[51] Int. Cl.$^5$ .............. C08G 18/48; C08K 3/10; C08K 5/00; D01H 5/86
[52] U.S. Cl. .................. 528/048; 528/55; 528/57; 528/58; 528/59; 528/76; 525/123; 525/127; 525/129; 525/130; 524/21; 524/314; 524/394; 524/401; 524/425; 524/777; 524/779; 524/839; 524/910; 524/912; 524/914; 57/315
[58] Field of Search .............. 428/423.1; 57/315; 528/76; 521/119, 125, 174, 176; 525/129, 123, 127, 130; 524/314, 394, 401, 425, 777, 779, 839, 910, 912, 914, 21

[56] References Cited

U.S. PATENT DOCUMENTS

| | | | |
|---|---|---|---|
| 2,450,409 | 10/1948 | Baymiller | 29/121.8 |
| 2,450,410 | 10/1948 | Baymiller | 29/121.8 |
| 2,860,382 | 11/1958 | Garrett | 524/132 |
| 3,645,924 | 2/1972 | Fogiel | 521/176 |
| 3,743,620 | 7/1973 | Frye | 524/401 |
| 3,938,399 | 2/1976 | Delfiol et al. | 74/232 |
| 4,618,630 | 10/1986 | Knobel et al. | 521/105 |
| 5,001,167 | 3/1991 | Wiltz, Jr. et al. | 428/423.1 |
| 5,077,330 | 12/1991 | Ehrhart et al. | 524/314 |

Primary Examiner—John Kight, III
Assistant Examiner—Rabon Sergent

[57] ABSTRACT

A water reaction synthesis with polyoxyethylene diol, diisocyanate and dibutyltin bis lauryl mercaptide produces a high molecular weight thermoplastic polyurethane-urea linear polymer with surface resistivity $10^{11}$–$10^6$ ohm/sq. Thermoplastic and/or elastomeric antistatic compositions containing other melt processable polymers and/or filler, and the polymer exhibit permanent protection. Antistatic protection can be increased when the polymer complexes with a metal salt such as lithium chloride, or lithium acetate. The composition is useful in the manufacture of antistatic floor coverings and textile texturing and drafting elements such as cots and aprons.

17 Claims, No Drawings

CONDUCTIVE POLYURETHANE-UREA/POLYETHYLENE OXIDE POLYMER

This application is a continuation-in-part of co-pending application Ser. No. 518,248, filed May 4, 1990, now U.S. Pat. No. 5,077,330, which is a continuation application of Ser. No. 237,315, filed Aug. 29, 1988, now abandoned.

BACKGROUND OF THE INVENTION

The present invention relates to the preparation and use of novel electrostatic discharge materials. More particularly, the invention relates to the preparation of high molecular weight, linear polyurethane-ureas from diisocyanates, polyoxyethylene diols and water and the use of these materials in applications in the electrostatic discharge areas such as a floor covering.

The present invention is also related to the use of a polyurethane-urea/polyethylene oxide (U-PEO) in manufacturing textile elements such as aprons and cots or roll covers. Textile aprons and cots or roll covers are used in drafting machines (such as spinning, drawing, roving and other drafting elements) for making yarns of cotton, rayon, worsted and synthetic fibers. The main function of cots (or roll covers) and aprons is to provide a surface to guide and control the roving to the spinning frame where "final draft" and twist are given to the fibers to convert them into useful yarns.

It has long been known that static charges which develop between isolated bodies are discharged when those bodies are brought into sufficiently close proximity or contact. Potentials as high as 30,000 volts have been reportedly generated simply by a person walking on a synthetic carpet. In recent years this phenomenon, always regarded as something of a nuisance, has become a major concern to the manufacturers of sensitive electronic equipment. A static discharge of only a few hundred volts can severely damage or ruin expensive electronic circuitry, and such damage can occur at any stage of the assembly process or during transportation or storage.

Static charges can accumulate on production workers, on assembly work surfaces, and on any of the tools and containers used in the assembly area. The need to prevent static discharge requires that the entire assembly environment be constructed from materials which will quickly dissipate static charge, effectively interconnecting all workers, surfaces and equipment with a common electrical ground.

There are two general classes of materials available for electrostatic discharge (ESD) protection in the electronics industries. The first of these classes is referred to as "conductive" materials, which typically have resistivities in the range of $10^3$ to $10^6$ ohms/square. These materials are typically made of plastics or elastomers which are filled or impregnated with conductive carbon black or metallic substances. In addition to their cost; most of these materials are dark and undecorative and cannot be coated for decoration, wearability or protection without losing their conductive qualities.

Conductive materials can also be made of inherently conductive polymers. Conductive polymers previously known include polyacetylene, polyphenylene and poly(pyrrole). Dopants such as $AsF_5$, substituted quinones, $FeCl_3$, $HClO_4$, $BF_4$ and iodine are added to improve conductivity. However, stability and compatibility problems as well as high cost and limited availability has limited the applications for these known polymers.

Charge dissipative materials, the second class, typically have resistivities in the range of $10^6$ to $10^{11}$ ohms/square. Most of these materials achieve their electrical conductivities through the use of topical chemicals such as antistats. These chemicals do not normally conduct electricity themselves, instead, they absorb moisture from the air which provides conductivity. Typically antistatic chemicals are small in molecular size. When mixed with plastics, they migrate to the surface and provide conductivity, particularly through moisture absorption.

For these reasons, the previously known charge dissipative materials are sensitive to the humidity of the environment. Furthermore, the performance of the material tends to degrade over time as the antistat which migrates to the surface might be lost by evaporation, cleaning or contact with other objects.

U.S. Pat. Nos. 3,852,255; 3,891,718; 3,893,979; and 3,911,047 disclose the synthesis of low molecular weight end-capped polyether polyurethanes for use as antistatic additives for fibers to provide surface resistivity values of the order of $10^{10}$ ohms after washing.

European Patent Application 0 142 792 discloses end-capped polyurethane oligomers useful for static dissipative coatings, providing $10^{12}$–$10^{13}$ ohms-cm volume resistivities.

U.S. Pat. No. 3,661,627 discloses using an aqueous bath to apply —CN groups to the surface of a preformed film or fiber to render it antistatic. U.S. Pat. No. 4,029,694 describes an ester/alkylene oxide antistatic agent for melt polymers such as the reaction product of dimethylterephthalate and an ethylene oxide adduct of a propylene oxide adduct of ethylenediamine. None of these references suggest the novel synthesis or polymers of the present invention.

In textile industries, the performance of cots and aprons used in the drafting system for spinning yarn is closely associated with the electrostatic characteristic of the composition of the cots and aprons. The quality of yarns generated from a drafting or spinning machine can be directly affected by the properties of the cots and aprons used in the system. In other words, when all variables in a yarn spinning process are kept constant, the drafting system with good cots and aprons will generate better quality yarns. The term "quality yarn" used in this description is a measure of the irregularity (i.e., the coefficient of variation CV) and the frequently-occurring yarn faults or "imperfections" of yarns generated from the drafting process. Such irregularities and "imperfections" of a yarn are directly related to the strength and uniformity of yarns with a given size. An actual physical measurement of the yarn quality can be performed using an Evenness Tester (e.g., the Uster Evenness Tester manufactured by Zellweger Uster Ltd. of Switzerland). The following parameters are generally recorded in a yarn quality test:

coefficient of variation—% CV.

Number of imperfections per 1000 meters of yarn at a given setting of the imperfection indicator—i.e., number of thin places, number of thick places, and number of neps.

It is generally believed that the hardness and surface characteristics (such as smoothness and electrical charge dissipation) of rubber based aprons and cots plays an important role in affecting the yarn quality in the yarn spinning process. Soft cots and flexible aprons are thought to be superior to hard cots and rigid aprons in terms of generating fewer irregularities and imperfections of yarns because soft cots and flexible aprons provide more surface area for contact between fibers and the cot and apron surface allowing a better control (less slipping) of the fibers in the yarn spinning process.

The electrostatic characteristic of a cot (or an apron) surface is important in a yarn spinning operation. Because yarn spinning processes are often carried out at high speed, the static charges, generated on the cot (or apron) surface by the contact between the high speed fibers and the cot (or apron) surfaces, pull fibers from the roving, causing imperfections and irregularities of the yarn products.

Considering the effect of cots and aprons on the efficiency of a yarn spinning operation and the quality of the final yarn product, a good cot and apron should possess the following characteristics:

resistant to lapping of fibers on the cot and apron surface (i.e., will not cause "ends down" and interrupt the yarn spinning process).

resistant to generating clearer waste, i.e., a tendency for waste fiber pulled from the roving by the cot and accumulate on the clearer board in a bunch-like formation, this could also cause irregularity of the yarn product.

resistant to abrasion caused by fibers passing through the surface of a cot (or an apron), i.e., long service life without rebuffing the cot surface or replacing the aprons to assure a good contact between fibers and the cot surface.

resistant to viscoelastic creep relaxation, i.e., maintaining good dimensional stability without shape changing to assure consistent properties and uniform evenness of the final yarn product.

As disclosed in the prior art, the lapping behavior of textile cots is connected to electrokinetic phenomena or the zeta potential (as measured by the electrical charges) at the cot surface (U.S. Pat. Nos. 2,450,409 and 2,450,410). Conventional cots were made of oil resistant synthetic rubbers, such as NBR (butadiene-acrylonitrile rubber). Such cot structures may be rendered lap resistant by the incorporation in the synthetic rubber of certain reaction products resulting from the digestion in water dispersion of a protein, such as the commercially available animal glue. U.S. Pat. No. 2,450,410 disclosed that cot structure containing animal glue and synthetic rubber could be made even better lap resistant if certain inorganic electrolytes or water ionizable inorganic substances were incorporated in the structure with the animal glue. U.S. Pat. No. 2,860,382 disclosed that polar plasticizers can also render antistatic characteristics to roll cover structures.

In a comparison of all of the ingredients used in a cot composition, animal glue is considered as one of the most important and one of the most widely used ingredients. In addition to rendering lap resistance, animal glue also reinforces a cot structure, providing resistance to abrasion and creep relaxation in actual cot performance. Unfortunately, the manufacturing process of textile cots involving animal glue is relatively labor intensive and time consuming. The mixing of animal glue with synthetic rubber requires fist digesting the glue in water, and after the glue is blended into the rubber, the water must be completely dried off before the vulcanization process. The water drying step is important because the water molecules remaining in the rubber composition will interfere with the rubber curing process and subsequently affect the performance of the final product. In addition, animal glue tends to harden the rubber cot structure, yet when the amount of animal glue used is reduced to make a soft cot structure, the final cot performance often suffers from lack of abrasion resistance and/or lapping resistance.

SUMMARY OF THE INVENTION

The present invention provides a material to render thermoplastics and elastomers static dissipative without significant darkening, and without degradation of such static dissipative qualities over time.

The present invention provides a polyurethane-urea/polyethylene oxide linear polymer by reacting 30 to 95 parts by weight of one or more polyethylene oxide diols with 5 to 70 parts by weight aliphatic diisocyanate and 0.1 to 2,000 parts (per 100 parts of total diol and diisocyanate) of water wherein the polymer dissipates static in a thermoplastic or elastomeric composition.

The preferred aliphatic diisocyanates include methylene bis(4-cyclohexylisocyanate), 1,6-hexamethylene diisocyanate and tetramethylxylene diisocyanate. The parts by weight of water is preferably 0.1 to 3 parts per one hundred parts of diol and diisocyanate.

It is preferred that the polymer comprise 40 to 90% polyethylene oxide and be employed in combination with filler within a thermoplastic composition.

A method for producing a linear, high molecular weight, static dissipative polyurethane-urea/polyethylene oxide polymer comprises the steps:

(a) reacting a polyoxyethylene diol and an equivalent excess of an aliphatic diisocyanate in the presence of a tin catalyst to form a prepolymer;

(b) mixing the prepolymer with water; and (c) heating to form a polymer.

A process for preparing a static dissipative material comprises the steps:

(1) preparing a linear polyurethane-urea/polyethylene oxide polymer;

(2) mixing the polymer with another thermoprocessable polymer, and/or a filler.

Optionally, a metal salt such as lithium acetate or chloride may be added to further enhance conductivity. The metal salt may be introduced via dissolution in the water used in step (b) above.

DETAILED DESCRIPTION OF THE INVENTION

It remained for the advance of the present invention to provide conveniently prepared, colorless charge dissipative polymers with a surface resistivity of $10^{11}$ to $10^6$ ohms/square to provide permanent antistatic protection for a wide variety of commercially useful thermal processable compositions. Charge dissipative materials prepared with the polymers have retained stable surface resistivities of $10^6$–$10^{11}$ ohms/square under conditions of heavy wear for almost a year and a half. The polymers are comparatively less sensitive to moisture and are not removed by washing as are most currently used antistatic compounds. The materials can be used without degrading appearance and have excellent filler acceptance. Although the polymers are not believed to form true molecular dispersions with most thermoplastics and/or elastomers, their high molecular weight and linear nature allows excellent compatibility, in a practical sense, with most thermoplastic and elastomer systems. This characteristic also minimizes the migration and loss of the polymer due to contact, providing permanent antistatic properties to the resulting structures.

Thermoplastics which can be blended with the polyurethane-urea of the invention are commercially available or can be prepared by known techniques. Thermoplastics found to be particularly useful in the practice of the invention include Surlyn ® and Elvax ® copolymers from DuPont such as ethylene-methacrylic acid copolymer zinc salt, acrylic acid-ethylene copolymer zinc salt, ethylene-methacrylic acid copolymer sodium salt and ethylene-vinyl acetate copolymer. Other suitable thermoplastics include polyvinyl chloride, polyesters, polyurethanes, polyvinyl alcohols, polyamides, polycarbonate, and polyolefin. Elastomers which can be used with or without thermoplastics include natural and synthetic rubbers or rubber materials generated from latices. A preferred rubber is butadiene-acrylonitrile. Other commercially available elastomers include neoprene, styrene-butadiene rubber and EPDM (ethylene-propylene diene monomer) rubber. Fillers which can be employed in thermoplastic and/or elastomeric compositions with the copolymers of the invention primarily comprise oxides of silicon, zinc, antimony, aluminum, or titanium and calcium carbonate. Fumed silica, alumina trihydrate, and limestone are preferred fillers, but other commercially available materials such as talc, clay, mica, wollastonite, and feldspar can be conveniently employed.

With respect to the use of fillers, it was unexpected to find that dilution of the composition did not significantly diminish antistatic protection, whereas physical properties are often considerably improved. The insensitivity to filler addition is a particularly important advance provided by the invention. This aspect is just as important from a practical viewpoint as the relative moisture insensitive characteristics of the polymers.

Stabilizers and processing aids can similarly be employed in conductive materials incorporating the polymers of the invention. These include sulfur, stearic acid, metal oxide, organo tin compounds, polyelectrolytes, and sodium silicate. While not being exhaustive, these may serve to suggest other materials or processes beneficial in combination with the new copolymers of the invention.

It is an advantage that the urethane-urea/polyethylene oxide polymers can be prepared without organic solvent, avoiding environmental precautions otherwise required. Variation in starting materials of the preparations illustrated below can produce polyurethane-urea/polyethylene oxides suitable for the practice of the invention. Equivalent reactants which produce substantially the same linear polymers are considered to be within the scope of the invention.

The novel synthetic method of the present invention allows the production of high molecular weight linear polymers with unique antistatic, processing and compatibility properties. Since the reaction of the prepolymer with water to form an amine is a slow reaction and the following reaction of the amine with isocyanate is relatively fast, the molecular weight of the polymer formed is relatively insensitive to the amount of water. Although the amount of water which actually reacts is less than three parts by weight, large excesses of water may be used since it does not interfere with attaining the desired molecular weight, and simply acts as a plasticizer and/or suspending agent for the polyurethane-urea. The presence of water further allows a convenient way to incorporate metal salts to be complexed to the polymer during the synthesis, thereby generating an even more conductive end product.

The synthetic method of the present invention provides a superior antistatic composition when 40 to 80% polyethylene oxide is incorporated in a polymer with a weight average molecular weight (Mw) of about 30,000 or higher, either with or without complexed metal salt.

The method of the invention can be illustrated by the following:

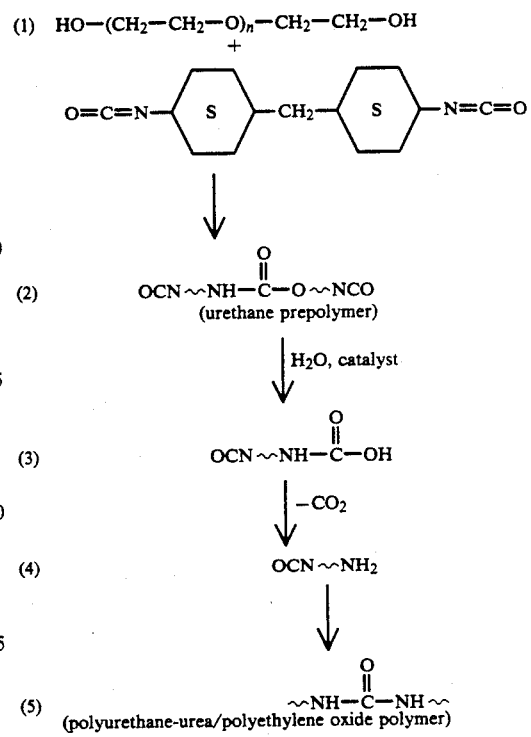

In (1), addition occurs wherein an alcohol is added across the C=N bond to form a linear NCO terminated urethane prepolymer (2).

When (2) is reacted with water in the presence of a tin catalyst, such as dibutyltin bis-(lauryl mercaptide), the terminal NCO group is converted to a carbonic acid to form the intermediate (3). Decarboxylation then produces an amine (4) which can react upon formation with a terminal NCO. While the reaction with water is relatively slow the amine groups react rapidly upon formation to chain extend the prepolymer via formation of urea groups, leading eventually to high molecular weight linear polyurethane urea (5).

Because the reaction of NCO with water is so much slower than the reaction with amine, there is no danger of termination, even when a large excess of water is employed. Thus, the discovery of this route to high molecular weight, linear, conductive polymers provides an advance in the state of the art wherein the use of water expedites the formation of high molecular weights and allows the convenient addition of metal salts which further enhance conductivity. It should also be noted that in many formulations, it is possible to incorporate the prepolymer and simply allow the formation of the high molecular weight polymer to occur gradually at ambient conditions, since the prepolymer reacts with atmospheric moisture.

The present invention has industrial applicability for materials in the field of ESD (Electrostatic Discharge), and textile texturing and drafting elements. Thermoplastic, elastomeric and combination materials thereof can be made antistatic by incorporation of polyurethane-urea/polyethylene oxides and/or their metal salt complexes.

In the following examples, surface resistivity measurements were conducted according to ASTM D-257 using an Electrotech Systems Inc. Resistivity Probe (Model 802) "IKE PROBE". An 11 pound weight applied force to the probe for all measurements. A Dr. Theidig Milli-To wide range resistance meter was connected to the probe for direct digital readout of resistance. The tests conducted at 50% RH were set up in a room controlled at $50 \pm 1\%$ RH and $23° \pm 1°$ C. temperature. The tests conducted at 15% RH were set up in a dry box controlled at $14 \pm 2\%$ RH and $23° \pm 1°$ C. temperature.

The following preparations and examples illustrate the practice of the invention of which Example 10 illustrates the Best Mode.

EXAMPLES

Polyurethane-urea/Polyethylene Oxide, Preparation A

A one liter (1 l.) flask was charged with 1 eq. or five hundred grams (500 g.) of a polyoxyethylene diol purchased from the Union Carbide Corp. under the tradename Carbowax ® 1000. After heating this material to 50° C., 1.6 eqs. or two hundred and ten grams (210 g.) of [methylene bis(4-cyclohexylisocyanate)], available from the Mobay Chemical Co. under the tradename Desmodur ® W, and three and fifty-five one-hundredths grams (3.55 g.) dibutyltin bis lauryl mercaptide, available from the Metal and Thermit Corp. with the trade designation T-20, were added in quick succession. The temperature was then raised to 115° C. and held there for 30 minutes in order to form an —NCO terminated prepolymer.

The reaction mixture, at 115° C., was then poured into a 1 gallon capacity plastic tub containing fourteen grams (14 g.) of deionized water. The resulting mixture was stirred, covered and placed in a 60° C. oven for 20 hours.

The resulting polymer which was taken from the tub was a white rubbery foam which could be consolidated to a solid elastomer sheet on a rubber mill. Gas Permeation Chromatography (GPC) weight average molecular weight (polystyrene calibration) was determined to be about 74,000.

Polyurethane-urea/Polyethylene Oxide, Preparation B

Following the procedure of preparation A, a polymer determined to have a GPC weight average molecular weight (polystyrene calibration) of about 43,000 was prepared from the following compounds:

| | |
|---|---|
| Polyoxyethylene diol (Carbowax ® 1450-Union Carbide) | 725 grams (1.0 eqs.) |
| [methylene bis(4-cyclohexylisocyanate)] (Desmodur ® W, Mobay Chemical) | 223 grams (1.7 eqs.) |
| dibutyltin bis lauryl mercaptide (T-20, Metal and Thermit Corp.) | 4.74 grams |
| deionized water | 19.0 grams |

The polymer had a surface resistivity of $10^7$ ohms/square at 50% R.H.

Polyurethane-urea Preparation C (Doping with metal salt)

A five liter flask was charged with 1859 gms. (2.56 eqs.) of a polyoxyethylene diol of approximately 1450 number average molecular weight, purchased from Union Carbide Corp. under the trade name, Carbowax ® 1450, 0.486 gms. of 2,6-di-tert-butyl-4-methylphenol antioxidant, and one drop of an antifoam obtained from Crucible Chemical Co. under the tradename Foamkill ® 8R. After heating to 50° C. under dry nitrogen, 4.36 eqs. or 571.5 gms. of methylene bis(4-cyclohexylisocyanate) and 12.15 gms. of dibutyltin bis lauryl mercaptide were added in quick succession. The temperature was then raised to 115° C. and held there for 30 minutes. The prepolymer thus formed, was cooled to 75° C. and 600 gms. of same was poured into each of four one gallon capacity plastic tubs each of which contained 147.5 gms. of a 40% aqueous solution of lithium acetate. These mixtures were stirred with a large spatula, let stand in a fume hood for one hour, then covered and placed in a 60° C. oven for 20 hours. The resulting polymer was removed from the tub as a white rubbery foam (plasticized by water) which could be partially dried and consolidated to a solid elastomeric sheet on a rubber mill. GPC weight average molecular weight (polystyrene calibration) was found to be 80,400.

Silicate/NBR Latex Coprecipitate, Preparation D

A 240 g portion of a carboxylated NBR latex (Reichlold Chemical 68-513) was added to a vessel containing 3000 cc of water. After a brief stirring, 211 g of sodium silicate (28% $SiO_2$ aqueous solution) was added. To precipitate the silicate and the latex, 400 cc of 1M calcium chloride solution was added to the silicate/latex solution while stirring. Stirring was continued until a clear supernatant was obtained in about five minutes. Water was drained off and the precipitated silicate/latex material was dried in an oven at 200° F. A dry powder was obtained in which silicate (about 60 phr) was well distributed throughout the NBR.

Example 1

Samples were prepared. Fifty grams (50 g.) of a ethylene-acrylic acid copolymer neutralized with a sodium salt available commercially from the E. I. duPont de Nemours Co. (DuPont) under the trade-mark Surlyn ® 8920, was milled on a two-roll mill which had been preheated to between 280° F. and 300° F. until a continuous film was formed. At this point, a 25 or 50 g portion of the polymer of Preparation B as shown in Table 1 was added and the milling operation continued until a uniform blended structure was obtained. Finally, fifty grams (50 g.) of ethylene propylene diene monomer rubber (EPDM), available commercially from DuPont under the tradename Nordel ® 2744, was added to the mill rolls and blending continued until the structure was homogeneously mixed.

The blended structure was subsequently taken off the mill rolls and heat pressed at 320° F. for five minutes in a stainless steel frame. Surface resistivities (Rs) and volume resistivities (Rv) as measured in accordance with ASTM D-257 method for the structures are also given in Table 1.

TABLE 1

| Sample | Preparation B (grams) | Surface Resistivity (Rs) (ohms/square) | Volume Resistivity (Rv) (ohm-cm) |
|---|---|---|---|
| 1A | 0 | $>10^{13}$ | $>10^{14}$ |
| 1B | 25 | $1.9 \times 10^{10}$ | $2.4 \times 10^{10}$ |
| 1C | 50 | $7.5 \times 10^{9}$ | $8.0 \times 10^{8}$ |

Example 2

Following the procedure of Example 1, a sample was prepared with one hundred grams (100 g.) of Surlyn ® 8920, fifty grams (50 g.) of the polymer of Preparation B and one hundred grams (100 g.) of EPDM. However, after the addition of the polymer of Preparation B and prior to the addition of the EPDM, five grams of an anionic polyelectrolyte commercially available from the Uniroyal Chemical Co. under the tradename Polywet ® KX4 was added to the mill rolls.

The blended structure obtained was measured to have a surface resistivity of $9.75 \times 10^{9}$ ohms/square and a volume resistivity of $2.5 \times 10^{9}$ ohm-cm.

Example 3

Following the procedures of Examples 1 and 2, a sample was prepared containing fifty grams (50 g.) of Surlyn ® 8920, fifty grams (50 g.) of the polymer of Preparation B, fifty grams (50 g.) of Nordel ® 2744, and ten grams (10 g.) of anionic polyelectrolyte Polywet ® KX4. In addition, one hundred grams of crushed limestone (325 Mesh) were added and mixed with the composition on the mill rolls.

The resulting structure was determined to have a surface resistivity (Rs) of $2.2 \times 10^{9}$ ohms/square and a volume resistivity (Rv) of $1.2 \times 10^{8}$ ohm-cm.

The sample was then stored in a normal room environment for six months and the resistivities were again determined. After such storage, the sample was determined to have a surface resistivity (Rs) of approximately $10^{9}$ ohms/square and a volume resistivity (Rv) of approximately $10^{8}$ ohms-cm.

Example 4

Samples were prepared from the following components in grams.

|  | Sample | | |
|---|---|---|---|
|  | 4A | 4B | 4C |
| Uncured nitrile rubber (g.) | 150 | 150 | 150 |
| Preparation B Polymer (g.) | 0 | 50 | 50 |
| Fumed Silica Particles (Aerosil ® 200 from Deguassa) (g.) | 60 | 60 | 60 |
| Aluminum Trihydrate (g.) | 0 | 0 | 100 |
| Zinc Oxide (parts per hundred parts rubber) | 5.0 | 5.0 | 5.0 |
| Stearic Acid (parts per hundred parts rubber) | 1.0 | 1.0 | 1.0 |
| MBTS (Altex) (pphr.) | 1.5 | 1.5 | 1.5 |
| TMTD (pphr.) | 1.0 | 1.0 | 1.0 |
| Sulfur (pphr.) | 3.0 | 3.0 | 3.0 |

The uncured nitrile rubber was first blended into a sheet structure using a two-roll mill preheated to about 250° to 270° F. Then the appropriate amount of Preparation B polymer was added, followed by the fumed silica particles and the aluminum trihydrate, as appropriate. The milling operation continued until the compositions were homogeneously mixed. The remaining ingredients, representing a sulfur curing package, was added to each. The blended structure was then taken from the mill rolls and heat pressed and cured in a stainless steel frame at 320° F. for 20 minutes. The structures exhibited the following resistivities:

|  | Sample 4A | Sample 4B | Sample 4C |
|---|---|---|---|
| Surface Resistivity (Rs) (ohms/sq.) | $3.2 \times 10^{13}$ | $7.9 \times 10^{9}$ | $5.0 \times 10^{10}$ |
| Volume Resistivity (Rv) (ohm-cm) | $2.5 \times 10^{14}$ | $3.4 \times 10^{9}$ | $4.9 \times 10^{9}$ |

Example 5

Employing the same processing as in Example 4, samples were prepared of the following compositions, in grams:

|  | Sample 5A | Sample 5B |
|---|---|---|
| NBR Rubber | 75 | 75 |
| Surlyn ® 8920 | 50 | 50 |
| Preparation B Polymer | 30 | 30 |
| Fumed Silica (Aerosil ® 200) | 30 | 30 |
| Aluminum Trihydrate | — | 50 |
| Surface Resistivity (Rs) (Ohms/sq.) | $1.7 \times 10^{9}$ | $2.5 \times 10^{9}$ |

Example 6

Employing the procedure of Example 3, samples were prepared of the following compositions, in grams:

|  | Sample 6A | Sample 6B |
|---|---|---|
| Ethylene/vinyl acetate copolymer (Elvax ® 360 from DuPont) | 150 | 150 |
| Preparation B Polymer | 50 | 50 |
| Fumed Silica (Aerosil ® 200) | 60 | 60 |
| Anionic Polyelectrolyte (Polywet ® 1766 from Uniroyal) | — | 10 |
| Surface Resistivity (Rs) (Ohms/sq.) | $5 \times 10^{10}$ | $1.5 \times 10^{10}$ |

Example 7

Following the procedures outlined in the above Examples, samples were prepared of the following compositions, in grams.

|  | Sample 7A | Sample 7B |
|---|---|---|
| Ethylene/vinyl acetate copolymer (Elvax ® 360 from DuPont) | 50 | 50 |
| NBR Rubber | 75 | 75 |
| Preparation B Polymer | 30 | — |
| Fumed Silica | 30 | 30 |
| Surface Resistivity (Rs) (Ohms/sq.) | $2.1 \times 10^{10}$ | $10^{13}$ |

Example 8

Samples were prepared of the following compositions, in grams:

| Sample | 8A | 8B | 8C | 8D | 8E | 8F | 8G | 8H | 8I | 8J | 8K |
|---|---|---|---|---|---|---|---|---|---|---|---|
| Preparation D Powder | 160 | 160 | 160 | 160 | 160 | 160 | 160 | 160 | 160 | 160 | 160 |
| Anionic Polyelectrolyte (Polywet ® KX4) | 10 | 10 | 10 | 10 | 10 | 10 | 10 | 10 | 10 | 10 | 10 |
| Prep. A Polymer | 20 | — | 50 | 50 | 50 | 50 | 50 | 50 | 50 | 50 | 50 |
| Prep. B Polymer | — | — | — | — | — | — | — | — | — | 50 | 50 |
| Aluminum Silicate | — | — | — | 25 | 50 | 75 | — | — | — | 50 | — |
| Mica | — | — | — | — | — | — | 50 | — | — | — | — |
| Clay | — | — | — | — | — | — | — | 50 | — | — | — |
| Aluminum Trihydr. | — | — | — | — | — | — | — | — | 50 | — | 100 |
| $R_S$ (ohm/square) × $10^{-10}$ | 9.3 | 35.0 | 0.89 | 4.5 | 3.9 | 7.4 | 6.9 | 2.5 | 2.1 | 0.36 | 0.3 |
| $R_V$ (ohm-cm) × $10^{-9}$ | 5.2 | 52.0 | 0.94 | 1.6 | 4.7 | 3.1 | 3.9 | 4.1 | 2.0 | 0.35 | 0.42 |

All of these samples maintained resistivities on the same order of magnitude one year after their preparation. The second sample which did not contain the polymers of the invention served as a control and gave the highest resistivities.

Example 9

Control (9A) and experimental (9B, 9C, 9D, 9E) tile formulations were prepared with the following ingredients, in parts by weight:

| Sample | 9A | 9B | 9C | 9D | 9E |
|---|---|---|---|---|---|
| PVC Resin | 36.3 | 36.3 | 36.3 | 36.3 | 36.3 |
| Di-2-ethylhexyl-phthalate | 6.0 | 6.0 | 6.0 | 6.0 | 6.0 |
| Stabilizer (Melamine base with a metallic soap) | 1.8 | 1.8 | 1.8 | 1.8 | 1.8 |
| TiO$_2$ | 2.34 | 2.34 | 2.34 | 2.34 | 2.34 |
| CaCO$_3$ | 244.30 | 244.30 | 244.30 | 244.30 | 244.30 |
| Processing aid (Alpha-methyl-styrene) | 3.0 | 3.0 | 3.0 | 3.0 | 3.0 |
| Preparation B | 0 | 20.0 | 20.0 | 20.0 | 20.0 |
| LiCl (40% in methanol) | 0 | 0 | 25.0 | 12.5 | 7.5 |

The LiCl in methanol and the polyurethane-urea/PEO copolymer from Preparation B were first mixed on a two roll mill which was preheated to 260°–280° F. After the methanol was evaporated and the mixture thoroughly mixed, other ingredients were added and the milling operation continued until a homogeneous composition resulted. The sheet structure generated from the milling operation was subsequently heat-pressed at 320° F. for five minutes to form tile materials. Surface resistivities were measured after cooling samples at ambient condition (40% RH, at 70° F.). The table below shows the resistivity results.

| Sample | Resistivity, ohm/sq (per ASTM D-257 method) |
|---|---|
| 9A | $> 10^{13}$ |
| 9B | $4.5 \times 10^9$ |
| 9C | $1.2 \times 10^6$ |
| 9D | $3.5 \times 10^6$ |
| 9E | $6.9 \times 10^6$ |

Samples 9C, 9D, and 9E were later placed in a humidity controlled chamber and conditioned at 12±3% RH at 70° F. for 48 hours. After the conditioning, all three samples still exhibited surface resistivities no higher than $10^7$ ohms/square. Sample 9D was taped down on a floor substrate and evaluated for long-term performance with respect to traffic. After 18 months of traffic wear and periodic washing and cleaning, the resistivity of the sample still showed $6 \times 10^6$ ohms/square at 40%–45% RH 78° F.

Example 10

Tiles were prepared using a vinyl composition as in Example 9 except that only 10 parts by weight of the polyurethane-urea/PEO with lithium acetate from Preparation C were used. A control sample without the polymer and lithium acetate had a surface resistivity greater than $10^{13}$ ohms/square while samples prepared according to this invention gave a surface resistivity of $1.1 \times 10^7$ ohms/square conditioned at 50% RH, 72° F. for 48 hours and $4.6 \times 10^8$ ohms/square conditioned at 15% RH, 72° F. for 72 hours.

In the case of textile products, because of the various difficulties involving animal glue in cots and aprons as described above, manufacturers of textile cot and apron products have tried for years to find a way to reduce or to eliminate the use of animal glue in making textile cots and aprons. The lack of "glue free" product in the marketplace clearly indicates that such an endeavor is not an easy task. Nevertheless, there are many attempts to make soft cots using thermoplastic materials (e.g., plasticized PVC) and/or reducing amount of animal glue (<30 phrs). Most of these products lack the balanced performance desired by the yarn spinning industry, especially regarding product longevity (i.e., abrasion resistance) and/or yarn quality (i.e., a result of poor lapping resistance and creep resistance of the cot and apron structure).

In the modern thermoplastic industries, polymers of different properties are often blended together to achieve certain desired properties which cannot be achieved by a single polymer alone. Polyurethanes possess excellent abrasion resistant characteristics and are often used in polymer blends to impart wear resistance to systems that lack such property. Therefore, it is desirable to incorporate polyurethanes in a cot or apron structure, especially in a soft cot or apron structure, to improve the wear resistance of the cot or apron product. Unfortunately, when ordinary polyurethanes, such as disclosed in U.S. Pat. No. 3,938,399, were used in a glue containing cot and apron composition, the water molecules associated with the animal glue during the mixing process tended to break down the composition. On the other hand, if no animal glue were used in the cot and apron composition containing ordinary polyurethane, the resulting cot and apron lacked the electrokinetic characteristic which is critical in rendering lap resistance of a cot and apron in the yarn spinning process.

We have found that using the polyurethane urea/-polyethylene oxide copolymer (U-PEO) of the present invention, we were able to make cots and aprons with excellent wear resistance and viscoelastic creep resistance. The U-PEO used in this invention could be used as a softening reagent in a glue containing composition without the employment of much plasticizer. Also, the U-PEO may be a metal salt complex or free of metal ions. The subject U-PEO could also be used without animal glue. In both cases, the resulting cot and apron products displayed excellent lapping resistance and physical properties required in a yarn spinning process. The yarns generated by the U-PEO containing cost and aprons showed superior yarn quality to similar cots and aprons without the U-PEO.

Example 11

The use of U-PEO, Preparation B, as a softening reagent in a soft cot composition was demonstrated as follows, in parts by weight:

| Compositions | 11A | 11B |
|---|---|---|
| NBR rubber | 100 | 100 |
| U-PEO (Preparation B) | — | 17 |
| Animal Glue | 40 | 40 |
| TiO$_2$ | 10.5 | 3.5 |
| Inorganic Pigment | 6.5 | 1.0 |
| Processing Aid (polyethylene glycol) | 1.0 | — |
| Plasticizer* | 24.2 | 35 |
| Vulcanization Reagents | | |
| Zinc Oxide | 5.0 | 5.0 |
| Sulfur | 7.2 | 8.7 |
| Accelerator (e.g., N,N,Diisopropyl-benzothiazole sulfenamide) | 1.3 | 1.0 |
| TMTM (Tetramethyl thiuran. monosulfide) | 0.2 | — |

*Plasticizer can be selected from the following list:

| Plasticizer Trade Name | Chemical Composition |
|---|---|
| 1. Plasticizer SC | Triethylene glycol ester of C$_6$-C$_{10}$ fatty acids |
| 2. Triacetin | Glycerol triacetate |
| 3. TBEP | Tributoxy ethyl phosphate |
| 4. Baker P-4 | Methyl acetyl ricinoleate |
| 5. Flexol TOF | Trioctyl phosphate |
| 6. Paraplex G-25 | Polyester (Linear)-poly (sebacate-glycol) |
| 7. Plastolein 9715 | Polyester (Linear)-poly (adipate glycol) |
| 8. Flexol 3 GO | Triglycol dioctoate |
| 9. | Butyl benzyl sebacate |
| 10. | Capryl benzyl sebacate |
| 11. Flexol 8N8 | 2-ethylhexyl diester amide |
| 12. | Tributyl phosphate |
| 13. Arneel Plasticizer | Fatty acid nitrile of C$_6$-C$_{20}$ fatty acids |
| 14. Flexol 4 GO | Polyethylene glycol di-2-ethylhexoate |
| 15. Flexol 3 GH | Triglycol dihexoate |
| 16. Flexol CS-24 | Di(2-ethylbutyl Cellosolve) succinate |
| 17. Thiokol TP90B | High M. W. Polyether C$_4$H$_9$OC$_2$H$_4$OC$_2$H$_4$OCH$_2$OC$_2$H$_4$OC$_2$H$_4$OC$_4$H$_9$ |
| 18. Thiokol TP95 | High M. W. Polyether ester (Di-butoxyethoxyethyl adipate) |
| 19. | Dioctyl styryl phosphonate |
| 20. | Dibutyl benzene phosphonate |
| 21. | Dioctyl benzene phosphonate |

Sample 11A was prepared in the following manner. The NBR rubber was first masticated for two minutes in a mill (started cold). The animal glue was premixed with water using a 4:1 glue/water ratio. The digested glue/water mixture was added to the rubber. Milling continued until the water was dried. Pigments, processing aids and plasticizers were subsequently added and mixed in the mill. The rubber/glue stock was then taken off from the mill and put aside for 24 hours.

The curing package ingredients were mill mixed into the rubber/glue stock the next day. The final batch of rubber stock material was then extruded into a tube configuration using a cold-fed vacuum vented extruder. The tube was subsequently cured in a steam heated oven at a temperature of 310° F. for 50 minutes. The cured tube was then cut into appropriate size and buffed with a stone grinder for testing.

Sample 11B, the urethane (U-PEO) containing sample, was prepared exactly the same way with the exception that the U-PEO and NBR rubber were first mixed in a mill which was pre-adjusted to 270°-280° F. After the rubber and the U-PEO were well mixed, the heat was turned off and the glue was introduced. The addition of other ingredients and the curing process were carried out the same way as Sample 11A.

| Properties | 11A | 11B |
|---|---|---|
| Shore A Hardness | 76 | 66 |
| Lapping Resistance | Good | Good |
| Clear Waste (mg/hr) | 12.47 | 7.45 |

The examples given here demonstrate the ability of the U-PEO in softening the glue containing cot structure without affecting the lap resistance of the glue containing structure, yet greatly reducing the clear waste of fiber in the spinning process.

The Clear Waste Test Method is as follows: The Clearer Waste Test uses freshly buffed and conditioned cots on a standard Casa Blanca type spinning frame. The frame is set up to spin carded cotton roving of 0.88 hank, single creel, with a front roll speed of about 135 revolutions per minute; a front roll weight of 30 pounds, total draft of 23.5 and spindle speed of 9500 RPM. The ends are pieced up and yarn is spun for 6 hours, with revolving clearers in place (this initial 6 hour spinning is done to break in the cots). The frame is reset and the 6 hour test is run. Flat clearers are installed and after each two hours of test the frame is shut down. The clearer waste is removed from the clearers for each individual arbor and placed in a container. The clearer waste is weighed and divided by 6 to determine average waste in milligrams per cot hour.

Yarn Quality Comparison

Tests were performed in a Suesen drafting machine using 100% carded cotton for 24's count yarn. After 90 days of continuous testing, the yarn quality checks were run. Data of the yarn quality results follows:

| Sample | 11A | 11B |
|---|---|---|
| % CV | 19.86 | 18.96 |
| Thins | 96 | 57 |
| Thicks | 889 | 773 |

Clearly, the U-PEO containing cot showed superior yarn quality to the conventional glue containing cots.

Example 12

This example compares properties of glue containing cot and U-PEO containing cot of similar hardness.

| Glue containing Cot Composition Sample 12 (in parts by weight) | |
| --- | --- |
| NBR Rubber | 70 |
| Cis-1,4-Polybutadiene Rubber | 30 |
| Animal Glue | 15.0 |
| TiO$_2$ | 15.0 |
| Pigment | 1.5 |
| Plasticizer | 14.5 |
| Sulfur | 6.2 |
| ZnO | 3.2 |
| Accelerator | 2.7 |

| Property Comparison | | |
| --- | --- | --- |
| Sample | 11B | 12 |
| Shore A Hardness | 66 | 66 |
| Lapping Resistance | Good | Good |
| Clear Waste (mg/hr) | 7.45 | 12.21 |
| Abrasion loss (mm$^3$) (Measured with Din 53 516 rotation abrasion tester) | 50 | 150 |

This example demonstrates that the urethane (U-PEO) containing cot is superior to conventional glue containing cot in both abrasion resistance and in offering yarn quality.

Example 13

This example demonstrates the effect of U-PEO concentration on the cot properties: Samples 13A and 13B have the same composition as Sample 11B with the exception that 25 parts by weight of plasticizer were used. Sample 13A contains 17 parts by weight U-PEO and Sample 13B contains 25 parts by weight of U-PEO.

| Sample Modulus at | 13A | 13B |
| --- | --- | --- |
| 50% elongation | 248 | 330 |
| 100% elongation | 369 | 469 |

| Flute mark resistance | | |
| --- | --- | --- |
| Initial | 0.0065/0.0055 | 0.007/0.0085 |
| Final | Trace | Trace |
| Shore A Hardness | 70 | 71 |
| Lap resistance | Good | Good |
| Clear Waste | 9.25 | 8.67 |

The increase in toughness at the lower elongation comes about when the urethane level is raised from 17 to 25 parts by weight. The resistance to flute marking was measured by placing an arbor on a fluted roll of a standard Casa Blanca type spinning frame weighted with 45 lbs. for 72 hours. The depth of the flute mark is then measured on the cots and recorded as the initial reading. The arbors are then run at 160 rpm for two hours and the depth of the flute mark measured after cooling is recorded as the final reading. Both samples showed only a trace of flute marking.

Example 14

This example illustrates that U-PEO can be used to replace animal glue in a cot composition. Sample 14 has the same composition as Sample 11B except no animal glue was used. The "glue free" composition displays acceptable viscoelastic properties (i.e., flute mark resistance) and excellent yarn handling properties.

| | 11B | 14 |
| --- | --- | --- |
| Shore A Hardness | 66 | 55 |
| Flute Mark | | |
| Initial | 0.0125 | 0.013 |
| Final | Trace | Trace |
| Lap Resistance | Good | Good |
| Clear Waste (mg/hr) | 7.45 | 6.75 |

What is claimed is:

1. A textile texturing or drafting element comprising a solid, thermoplastic polyurethane-urea/polyethylene oxide polymer which is the reaction product of reactants comprising (a) 30 to 95 parts by weight of polyethylene oxide diol per one hundred parts diol and diisocyanate, (b) 5 to 70 parts by weight of an aliphatic diisocyanate per one hundred parts of diol and diisocyanate and (c) 0.1 to 2,000 parts by weight of water per one hundred parts of diol and diisocyanate.

2. The textile element of claim 1 wherein the element is a cot or apron.

3. The textile element of claim 1 further comprising a metal salt.

4. The textile element of claim 3 wherein the metal salt is lithium chloride or lithium acetate.

5. The textile element of claim 1 wherein (c) is 0.1 to 3 parts water per one hundred parts of diol and diisocyanate.

6. The textile element of claim 1 wherein the aliphatic diisocyanate is selected from the group consisting of methylene bis(4-cyclohexylisocyanate), 1,6-hexamethylene diisocyanate and tetramethylxylene diisocyanate.

7. The textile element of claim 1 further comprising a vulcanizable rubber.

8. The textile element of claim 7 wherein the rubber is a nitrile rubber.

9. The textile element of claim 1 further comprising animal glue.

10. The textile element of claim 1 wherein the polyurethane-urea/polyethylene oxide polymer is substantially linear.

11. The textile element of claim 10 wherein the polyurethane-urea/polyethylene oxide polymer has a weight average molecular weight of at least 30,000.

12. The textile element of claim 1 wherein the active hydrogen reactants consist essentially of diol and water, and the isocyanate reactants consist essentially of aliphatic diisocyanate.

13. The textile element of claim 1 wherein the active hydrogen reactants consist essentially of polyethylene oxide diol and water.

14. The textile element of claim 1 wherein the water is reacted after the polyethylene oxide diol and diisocyanate are reacted.

15. A textile texturing or drafting element comprising a solid, thermoplastic polyurethane-urea/polyethylene oxide polymer which is the reaction product of (a) 30 to 95 parts by weight polyethylene oxide diol per one hundred parts of diol and diisocyanate, (b) 5 to 70 parts by weight methylene bis(4-cyclohexylisocyanate) per one hundred parts of diol and diisocyanate and (c) 0.1 to 2,000 parts by weight water per one hundred parts of diol and diisocyanate.

16. A solid, thermoplastic polyurethane-urea/-polyethylene oxide polymer which is the reaction product of reactants consisting essentially of (a) 30 to 95 parts by weight of polyethylene oxide diol per one hundred parts diol and diisocyanate, (b) 5 to 70 parts by weight of an aliphatic diisocyanate per one hundred parts of diol and diisocyanate and (c) 0.1 to 2,000 parts by weight of water per one hundred parts of diol and diisocyanate.

17. A textile texturing or drafting element comprising the polymer of claim 16.

* * * * *